(12) United States Patent
Lepage et al.

(10) Patent No.: US 7,546,966 B2
(45) Date of Patent: Jun. 16, 2009

(54) BALE PROCESSOR WITH FEED CUTTER

(75) Inventors: Charles Lepage, Saskatoon (CA);
Kimball Lischynski, Saskatoon (CA);
Murray Kosokowsky, Pilger (CA)

(73) Assignee: Highline Manufacturing Ltd., Vonda, Saskatchewan (CA)

( * ) Notice: Subject to any disclaimer, the term of this patent is extended or adjusted under 35 U.S.C. 154(b) by 44 days.

(21) Appl. No.: 11/176,449

(22) Filed: Jul. 7, 2005

(65) Prior Publication Data
US 2006/0006266 A1      Jan. 12, 2006

(51) Int. Cl.
*B02C 18/30* (2006.01)
*B01L 9/00* (2006.01)
*B02C 23/00* (2006.01)
*B24B 41/00* (2006.01)

(52) U.S. Cl. .................................. 241/285.2; 241/605
(58) Field of Classification Search ................. 241/605, 241/285.3, 285.2
See application file for complete search history.

(56) References Cited

U.S. PATENT DOCUMENTS

| | | | | |
|---|---|---|---|---|
| 2,685,900 A | * | 8/1954 | Cross | 241/101.762 |
| 4,342,319 A | | 8/1982 | Willis et al. | |
| 4,524,916 A | * | 6/1985 | Keyes et al. | 241/101.76 |
| 4,998,679 A | | 3/1991 | Bender | |
| 5,340,040 A | * | 8/1994 | Bussiere et al. | 241/101.761 |
| 5,482,508 A | | 1/1996 | Redekop et al. | |
| 5,501,635 A | | 3/1996 | Niermann | |
| 5,601,241 A | * | 2/1997 | Brewster | 241/101.76 |
| 5,803,375 A | * | 9/1998 | Hartwig | 241/28 |
| 5,967,433 A | * | 10/1999 | O'Neill et al. | 241/101.2 |
| 6,029,919 A | * | 2/2000 | Rousseau | 241/101.2 |
| 6,251,009 B1 | | 6/2001 | Grywacheski et al. | |
| 6,331,142 B1 | | 12/2001 | Bischoff | |
| 6,478,674 B2 | | 11/2002 | Redekop | |
| 6,511,374 B2 | * | 1/2003 | VanEe | 460/112 |
| 6,616,528 B2 | | 9/2003 | Wolters et al. | |
| 6,648,254 B2 | * | 11/2003 | Hruska | 241/101.763 |
| 6,656,038 B1 | | 12/2003 | Persson | |
| 6,688,972 B2 | | 2/2004 | Büermann et al. | |

OTHER PUBLICATIONS

Rem Manufacturing Ltd., Rugged Reliable . . . Rem BaleMAX 3600R Options, Brochure, Nov. 22, 2002, Rem Manufacturing Ltd, Swift Current Saskatchewan, Canada.

* cited by examiner

*Primary Examiner*—Bena Miller
(74) *Attorney, Agent, or Firm*—Dicke, Billig & Czaja PLLC

(57) ABSTRACT

A feed cutter is mounted in a discharge area of a bale processor and includes a rotating member with a series of mounted blades. The feed cutter may be used to substantially reduce the length of crop material separated from a bale being processed that is to be used to feed livestock. Optionally, the feed cutter may be mounted to facilitate discharge of material from the processor with or without further processing by the feed cutter.

13 Claims, 14 Drawing Sheets

BALE PROCESSOR WITH FEED CUTTER

FIELD OF THE INVENTION

The present invention relates to farm machinery for shredding bales and, more particularly, to a bale processor employing a feed cutter.

BACKGROUND

In the livestock industry, large round and square bales are shredded to feed and bed livestock. One type of bale processor currently in the market includes a "disintegrator" roller longitudinally mounted for rotation inside a processing chamber. The disintegrator roller is rotated, and flails on the roller extend to engage a bale in the processing chamber, shred the baled material and discharge the shredded material out of the processor. Other types of bale processors are known to use alternative disintegrator devices for processing the baled material, such as an unrolling chain.

These bale processors are used to process materials such as dry hay and silage to feed livestock. Known disintegrator devices have little control over the length of the material which is discharged from the bale processor. Further, the length of the processed material discharged is dependant on the original length of the material, the type of material and the design of the disintegrator device.

It is advantageous to reduce the length of the baled crop material to increase the utilization of the shredded material as feed by the livestock. When the feed is shorter, it may be easier to pick up, to chew and to digest. Thus, increased weight gains or milk production may be realized. A bale processor with enhanced control over the length of the material that is discharged is accordingly desirable.

SUMMARY

A feed cutter is installed in the discharge opening of a bale processor and used to reduce the length of crop material shredded from a bale, which material is to be used to feed livestock.

In accordance with one aspect of the present invention there is provided a bale processor. The bale processor includes a processing chamber having a discharge opening. The bale processor also includes a disintegrator mounted in the processing chamber adapted to separate baled crop material in the processing chamber and discharge it out of the processing chamber through the discharge opening and a feed cutter mounted at the discharge opening of the processing chamber such that it may receive and further process material being discharged out of the processing chamber.

Other aspects and features of the present invention will become apparent to those of ordinary skill in the art upon review of the following description of exemplary embodiments of the invention in conjunction with the accompanying figures.

BRIEF DESCRIPTION OF THE DRAWINGS

In the figures, which illustrate embodiments exemplary of the invention.

DETAILED DESCRIPTION

Figure 1:
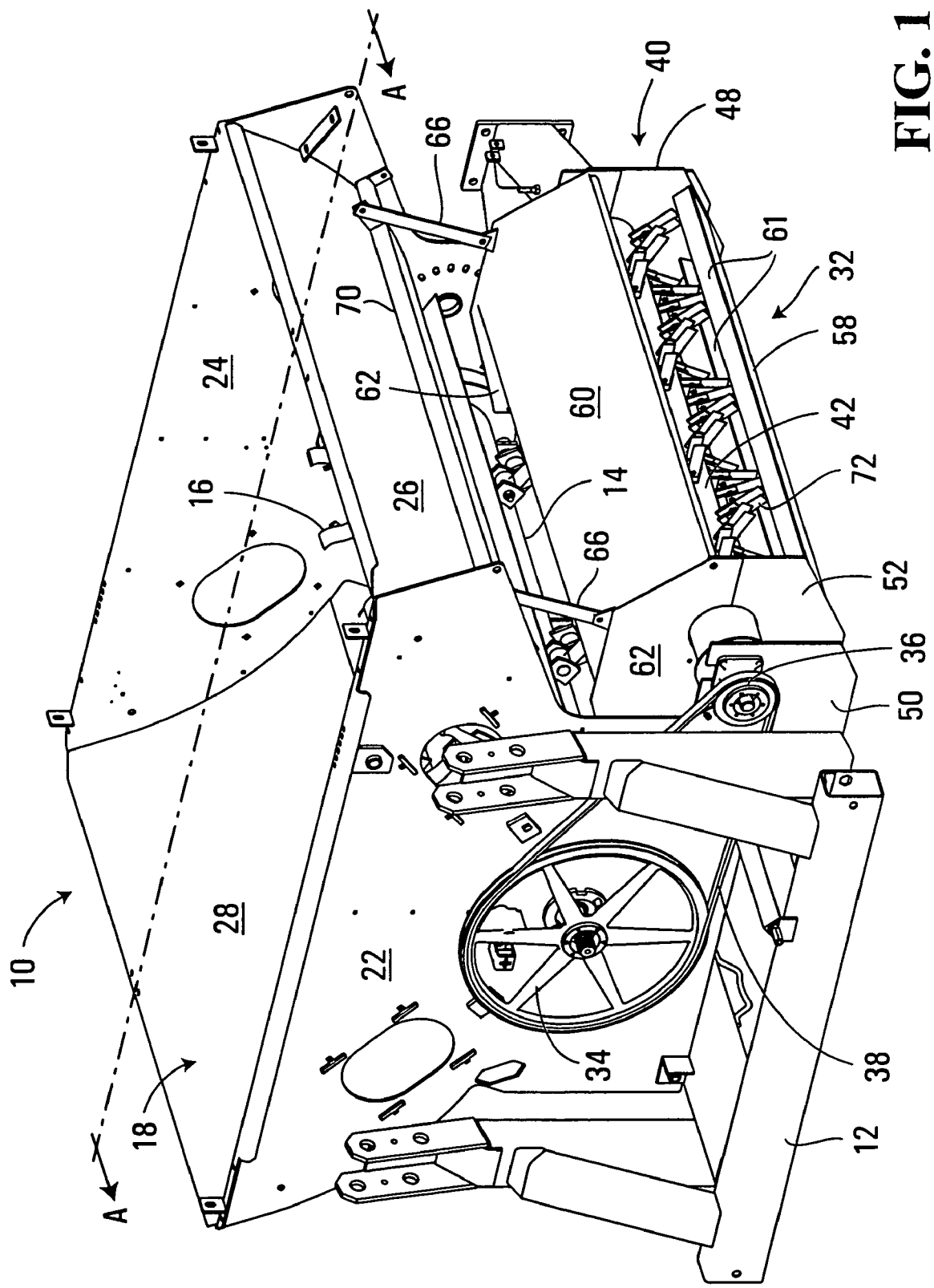
FIG. 1 is a rear perspective view of a first embodiment of a bale processor including a feed cutter according to the invention.

FIGS. 1-4 illustrate an exemplary bale processor 10 showing a preferred embodiment of the present invention. The bale processor 10 has a frame structure 12 that supports processing chamber 18 having a rear end wall 22, a front end wall 24, a right side wall 26 and a left side wall 28. In the embodiment shown in FIG. 1, a discharge opening 32, through which processed crop material is discharged, is defined on the right side of the bale processor 10. A disintegrator 14 is rotatably mounted in the processing chamber 18.

In the illustrated embodiment, the disintegrator comprises a flail roller 14 mounted for rotation in the bottom of the processing chamber 18 between the rear end wall 22 and the front end wall 24. The flail roller 14 is rotatable about its longitudinal axis. Additionally, one or more driven manipulators (not shown) may be rotatably mounted in the processing chamber 18 between the rear end wall 22 and the front end wall 24. In the embodiment shown, manipulators and/or supports are mounted above the flail roller 14, one toward the right side wall 26 and the other toward the left side wall 28. A plurality of flails 16 pivotally mounted on the flail roller 14 extend under centrifugal forces to engage and separate baled material from a bale supported above it when the processor is operated.

The flail roller 14 is typically rotated by the power take-off (PTO) drive of a tractor. In the illustrated embodiment, the flail roller 14 is rotated in a counterclockwise direction (viewed from the back toward the front of the machine) and the flail roller 14 may be connected to the PTO drive through known rotation conversion means. Alternatively, a different type of power source, such as a reversible hydraulic motor, may be used to drive the flail roller 14. Typically, the flail roller 14 will be rotated at approximately 1000 rpm (the speed of the PTO drive of most tractors), although the flail roller 14 may be designed to be rotated at rates in the range of 500 to 2,000 rpm.

A feed cutter, indicated generally as 40 in FIG. 1, is mounted in the discharge opening 32 of the processing chamber 18. The feed cutter 40, which is illustrated in an exploded manner in FIG. 2, includes a rotating member 42 mounted on a mounting frame 44. The mounting frame 44 includes a front end plate 46, a front guard plate 48, a rear end plate 50, a rear guard plate 52, a front frame attachment plate 54, a rear frame attachment plate 56 and a bottom pan 58. Also mounted to the mounting frame 44 is a top deflector 60 and side deflectors 62 on each end of the mounting frame 44 (only the rear side deflector being shown in FIG. 2).

The bottom pan 58 and the plates 46, 48, 50, 52, 54, 56 are welded together to form the mounting frame 44. In addition, there are ribs 61 welded to the bottom pan 58.

The mounting frame 44 is attached to the processor 10 by bolting it to the frame structure 12 through holes in the frame attachment plates 54, 56 and to the rear end wall 22 and front end wall 24 through holes in the end plates 46, 50. The top deflector 60 and side deflector 62 are attached by bolting them to the guard plates 48, 52. The side deflectors 62 are rigidly attached while the top deflector 60 is pivotally attached through corresponding holes 63 on the support plates 48, 52, and top deflector 60.

Figure 2:
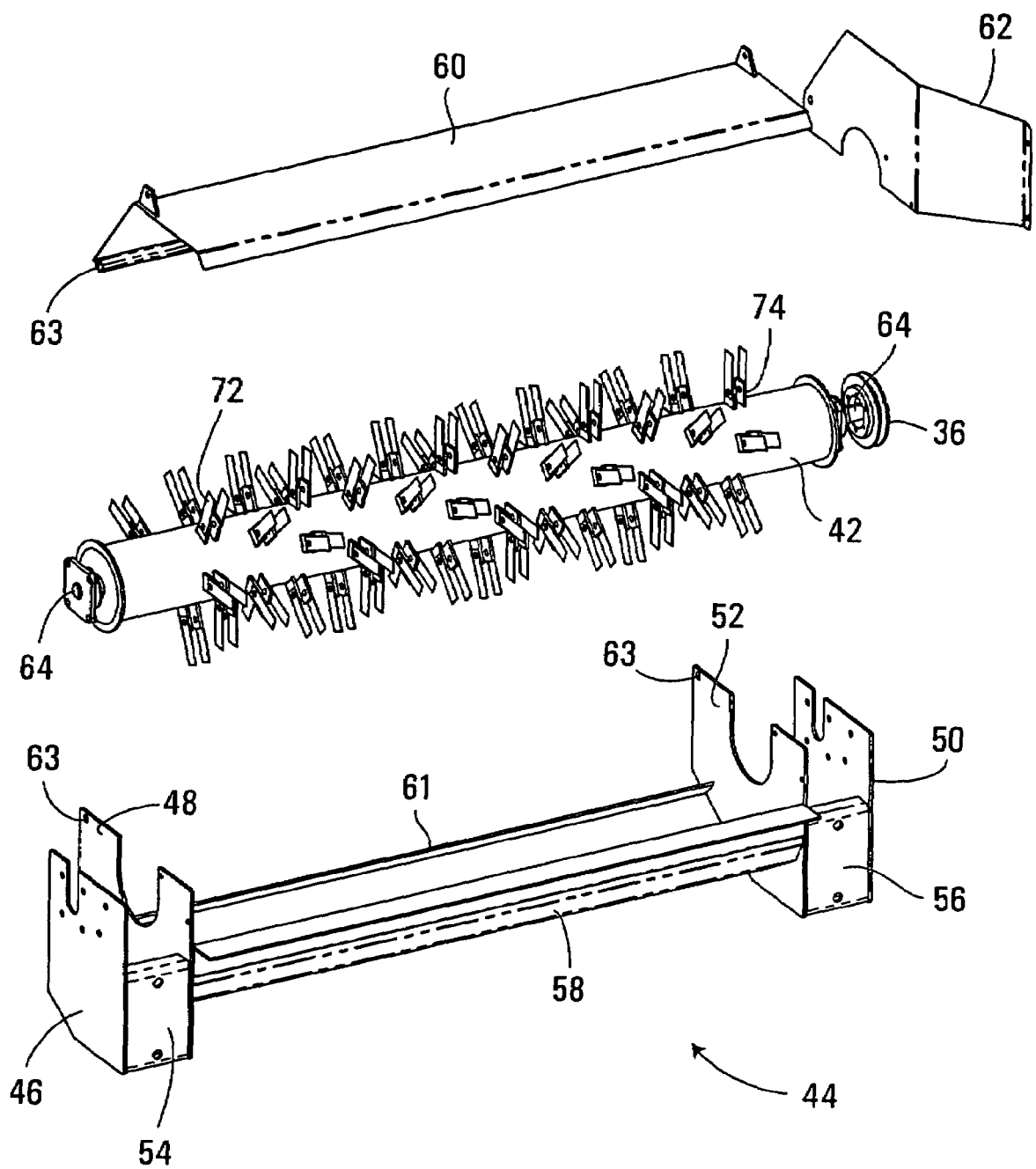
FIG. 2 is an exploded perspective view of the feed cutter of FIG. 1.

As evident from FIG. 2, the rotating member 42 is a cylindrical member having blade members 72 mounted in pairs to mounting projections 74 arranged in a spiral pattern around the rotating member 42. Accordingly, in this embodiment, the blade members 72 are pivotally mounted and removable. However, the manner of attachment is not essential and they may be rigidly or pivotally attached in any suitable manner and in any suitable pattern.

The rotating member 42 includes a shaft 64 that extends axially from the front and rear end of the rotary member 42. The shaft 64 is supported at each end by a set of bearings mounted to the front and rear end plates 50, 46 of the mounting frame 44.

As stated, the flail roller 14 is typically rotated by the PTO drive of a tractor. Through the use of a transmission mechanism, the PTO may also be used to drive the feed cutter 40. The transmission mechanism may include a belt, chain or gearbox and driveline arrangement.

An exemplary transmission is illustrated in FIG. 1, wherein a primary pulley 34 is mounted to a driven shaft of the flail roller 14. A secondary pulley 36 is mounted to the shaft 64 of the rotating member 42. A belt 38 transfers rotation of the primary pulley 34 to the secondary pulley 36 and, thus, rotation to the rotating member 42.

Alternatively, a gear or chain drive transmission, or any other suitable transmission means, may be used to transmit the rotation of the flail roller 14 to rotation of the rotating member 42. In a chain drive transmission, a primary sprocket replaces the primary pulley 34 mounted to the driven shaft of the flail roller 14 and a secondary sprocket replaces the secondary pulley 36 mounted to the shaft 64 of the rotating member 42. A chain replaces the belt 38 for transferring rotation of the primary sprocket to rotation of the secondary sprocket. In a gear drive transmission, a primary gear box replaces the primary pulley 34 mounted to the driven shaft of the flail roller 14 and a secondary gear box replaces the secondary pulley 36 mounted to the shaft 64 of the rotating member 42. A driveshaft is arranged to connect the primary gear box to the secondary spur gear to transfer rotation at the primary gear box to rotation at the secondary gear box. As a further alternative, the rotation of the rotating member 42 may be independent of the rotation of the flail roller 14 and may be driven by a designated hydraulic, electric or other motor.

As noted, the top deflector 60 is bolted to the guard plates 48, 52 such that it is able to pivot around the holes 63 in the guard plates 48, 52. In addition, the top deflector 60 is connected on each side to front and back connecting rods 66 which are in turn connected through a pivotal linkage 68 to a rotatable rod 70 (see FIG. 4). Rotation of the rod 70 may be undertaken to move the top deflector 60 from the position shown in FIG. 3, which is utilized when it is desired to run the feed cutter 40 for cutting baled material being processed by the bale processor, to the position shown in FIG. 4, which effectively isolates the feed cutter 40 and facilitates operation of the bale processor 10 without the feed cutter 40. When that is desired, the rotary member 42 of the feed cutter 40 is disengaged from its drive system. Note that blade members 72 are not shown in FIG. 4.

In the embodiment shown in FIGS. 1-4, adjustment of the top deflector 60 is accomplished manually. However, different moving mechanisms may be added including lever systems, electrical systems or hydraulic systems to cause movement and control the position of the top deflector 60.

With respect to the ribs 61, as noted, in the embodiment shown, the ribs are welded to the bottom pan 58. However, they may be bolted to the pan thereby providing the ability to remove them if damaged, or otherwise attached in any suitable manner. The number, spacing and height of the ribs 61, spacing from the rotary member 42 and the number and spacing of the blades 72 may be varied depending upon the desired length of shredded material, the conditions in which the processing is being performed, the materials being processed and the desired degree of processing.

Figure 3:
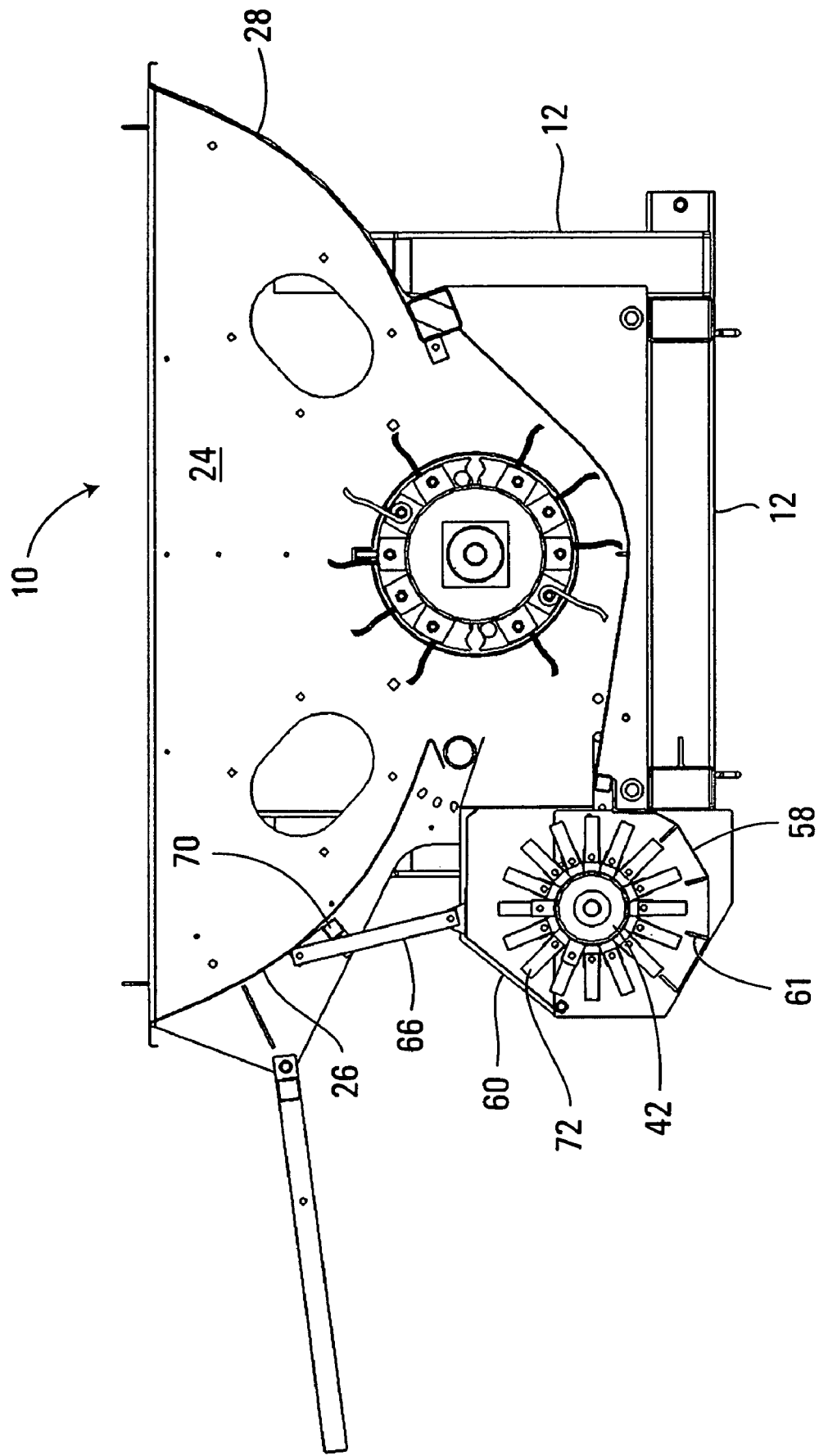
FIG. 3 is a cross sectional view in the direction of line AA of the bale processor of FIG. 1, with the feed cutter in a working position
Figure 4:
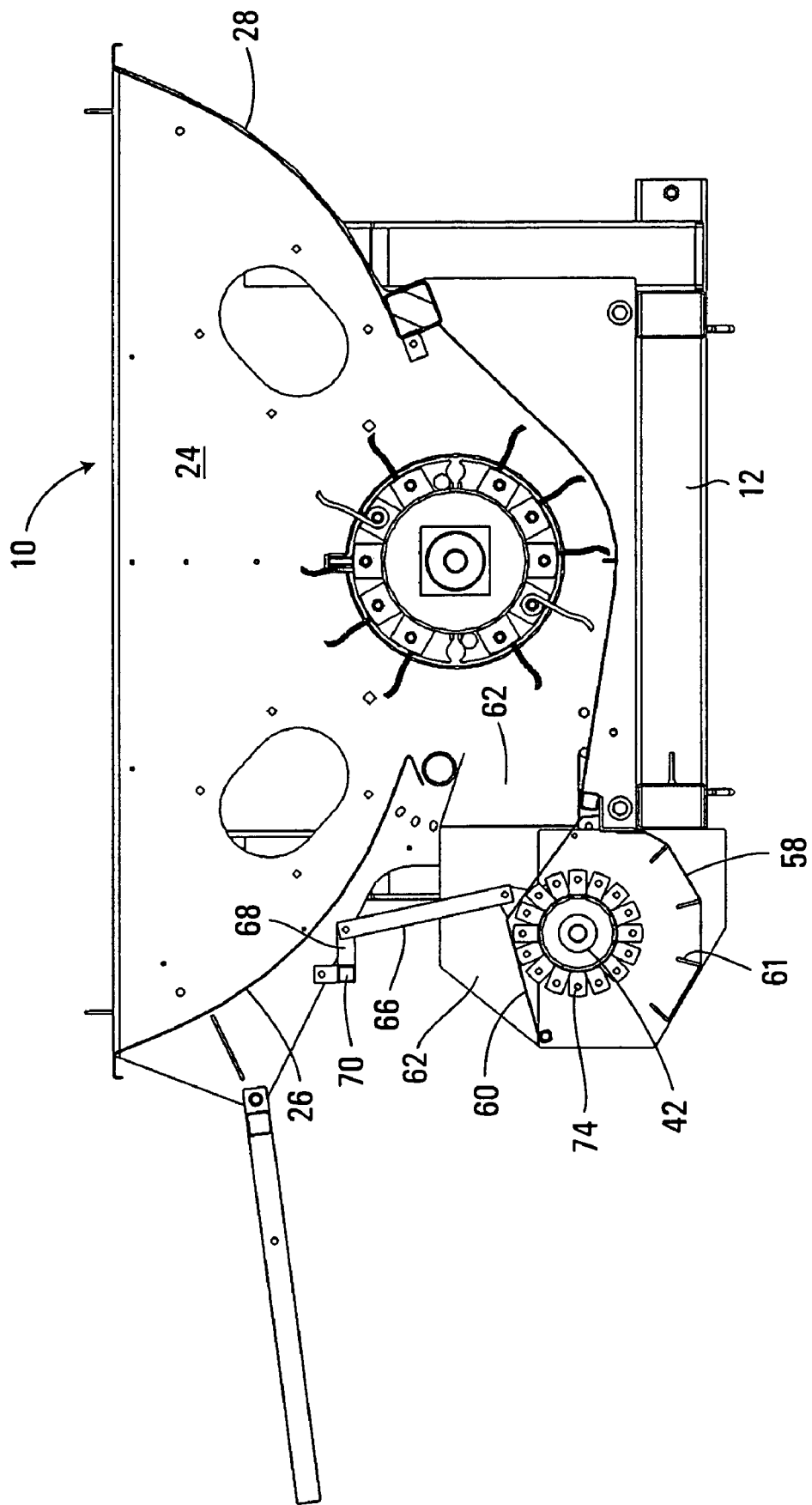
FIG. 4 is a cross sectional view in the direction of line AA of the bale processor of FIG. 1, with the feed cutter in a non-working position.

Generally, the feed cutter 40 will be mounted and arranged such that processed crop material being discharged from the processor will, when the top deflector 60 is in the position shown in FIG. 3, be directed into the feed cutter 40. The rotating member 42 is mounted so that the blades 72 are in close proximity to the ribs 61 as they rotate past them. In typical conditions, at least 12 mm clearance should be provided between the blades 72 and the ribs 61 when the feed cutter 40 is operated.

In operation, baled crop material is loaded into the processing chamber 18 for disintegration. The flail roller 14 separates baled crop material while the bale is manipulated in the processing chamber 18 to expose different parts of the bale to the flail roller 14. During operation, as the flail roller 14 is rotated in a counterclockwise direction (viewed from the back of the machine), the flails 16 extend radially to engage the baled crop material, separating the baled material from the bale and discharging the separated material toward the feed cutter 40 in the discharge opening 32. Since the feed cutter 40 does not extend the full length of the discharge opening 32, side deflectors 62 are provided to direct separated product being processed into the feed cutter 40. When the top deflector 60 is in the position shown in FIG. 4, material being processed is discharged through the upper portion of the discharge opening 32 above the top deflector 60 and the feed cutter is not utilized.

When the feed cutter 40 is operational, the rotating member 42 is rotated in a counterclockwise direction (viewed from the back of the machine). The separated material is cut through impact of the blades 72 on the rotating member 42 with the material. The rotation of the rotating member 42 creates an airflow over the bottom pan 58 and the ribs 61 increase the turbulence of that airflow promoting random movement of the separated material and increasing the number and force of the impacts of the blades 72 on the separated material to effectively shorten the average length of said material.

Figure 5:
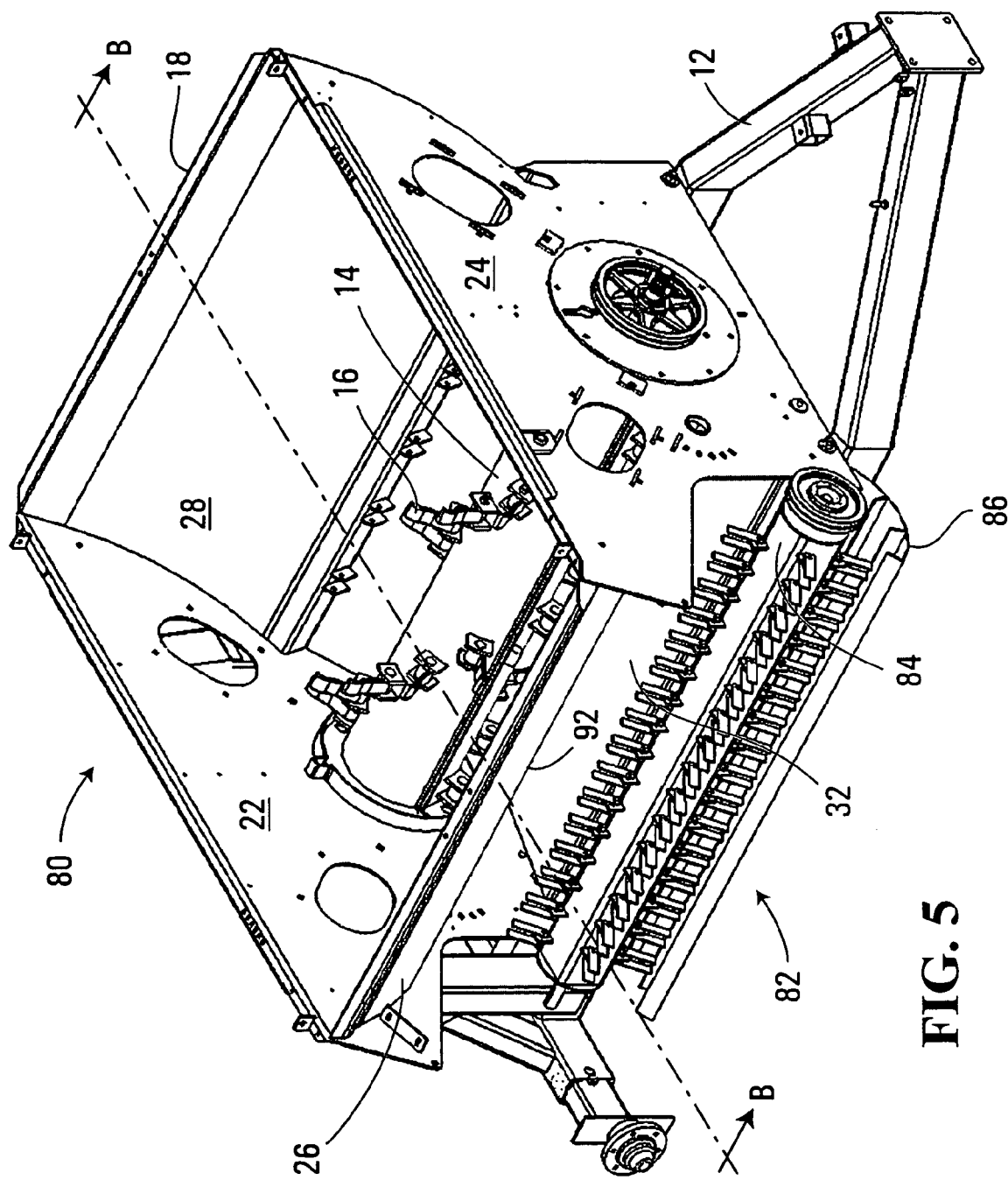
FIG. 5 is a front perspective view of a second embodiment of a bale processor including a feed cutter according to the invention.
Figure 6:
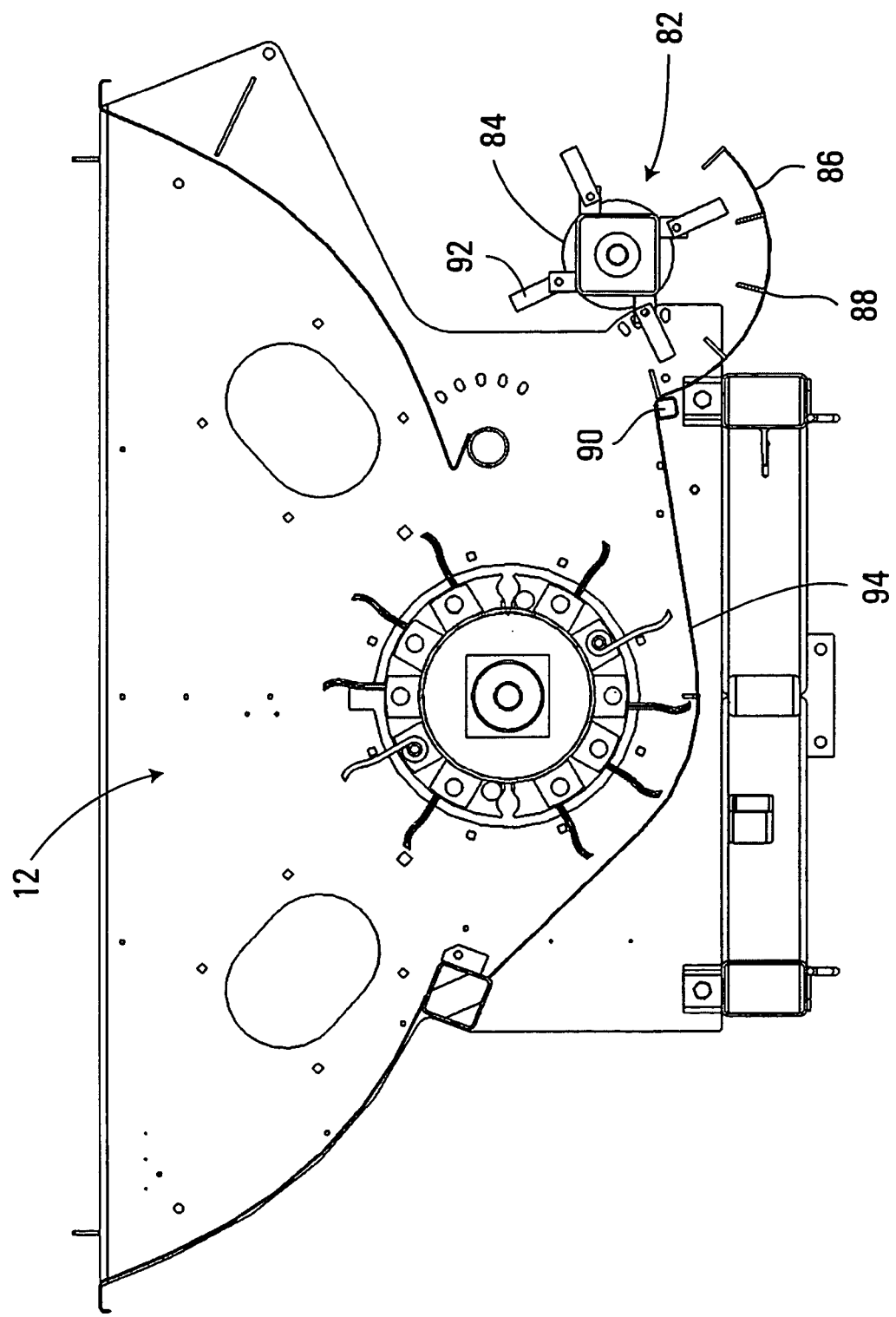
FIG. 6 is a cross sectional view in the direction of line BB of the bale processor of FIG. 5.
Figure 7:
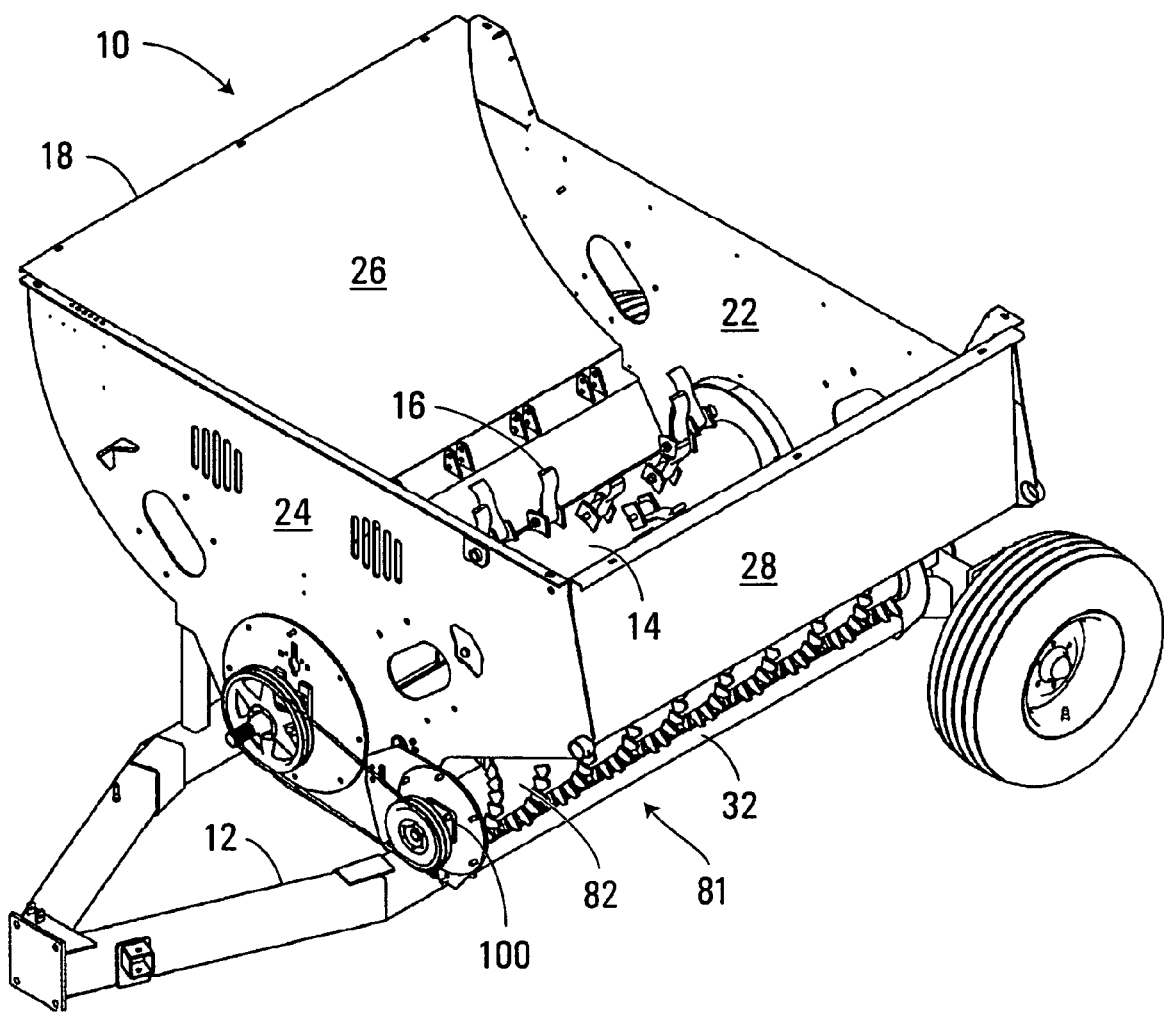
FIG. 7 is a front perspective view of a third embodiment of a bale processor including a feed cutter according to the invention.

FIGS. 5 and 6 illustrate a bale processor 80 including a second embodiment of a feed cutter 82. The bale processor is similar to the bale processor 10 and the same numbers are utilized to identify similar elements of the bale processor.

The second embodiment of a feed cutter 82 includes a rotating member 84 that is somewhat modified from the rotating member 42 of the previous embodiment. Specifically, the rotating member 84 has a square cross-section and the cutting blades are mounted in separated axial lines along the rotary member 84. Further, it will be noted that the rotating member 84 extends across the entire discharge opening 32 and, accordingly, no side deflectors are required. Additionally, as illustrated in FIGS. 5 and 6, the transmission mechanism used to drive the rotating member 84 is located at the front end wall 24, rather than the rear end wall 22, as illustrated in FIG. 1.

Figure 8:
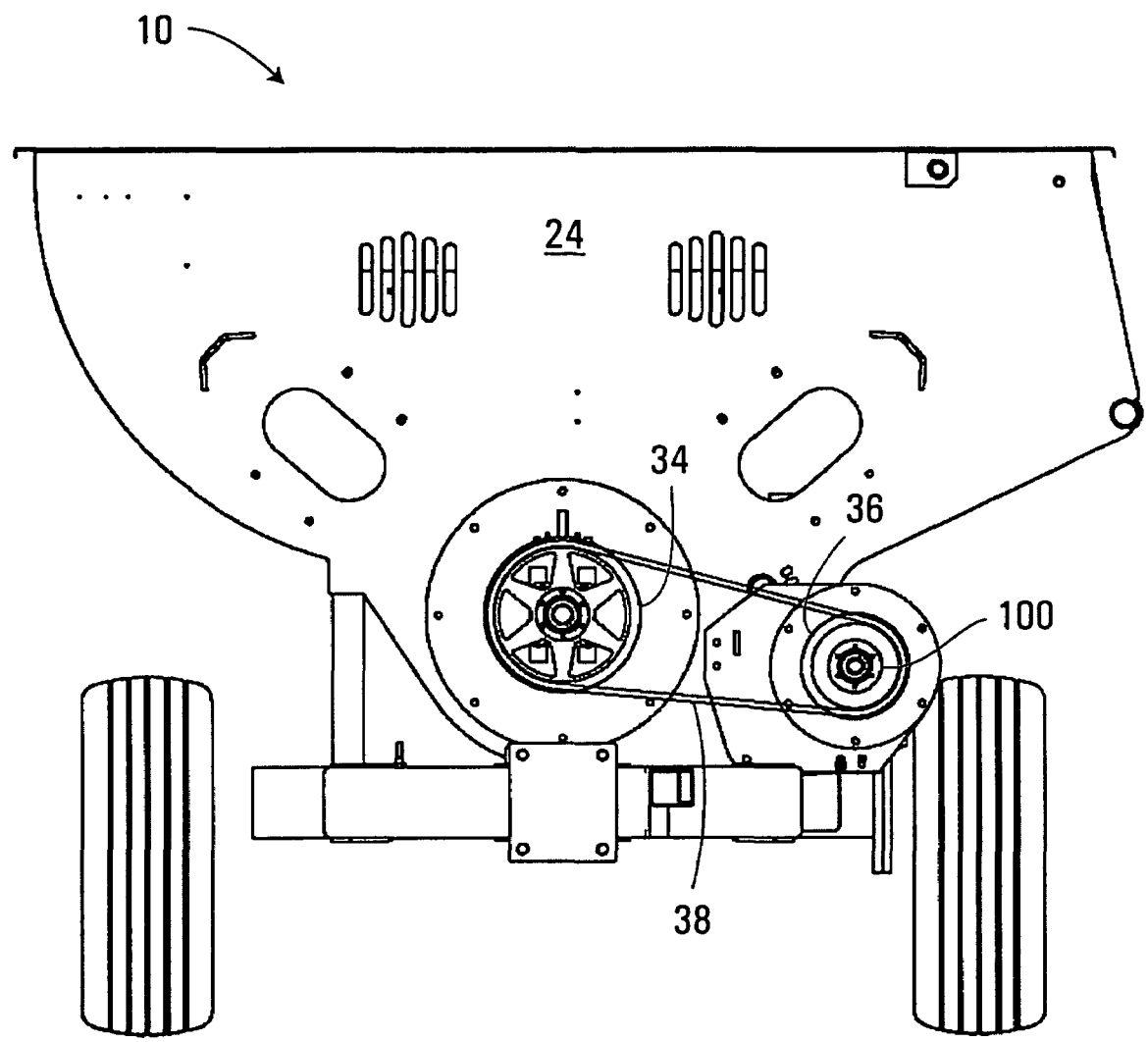
FIG. 8 is a front view of the bale processor of FIG. 7.

FIGS. 7-11 disclose yet a further embodiment of the invention. Again using the same numbers for like parts where appropriate, a third embodiment of a feed cutter 81 is mounted in the discharge opening 32 of the processing chamber 18. The feed cutter 81, which is illustrated in an exploded manner in FIG. 9, includes a rotating member 82 mounted to a mounting frame 84. The mounting frame 84 includes a rear end plate 86, a front end plate 88 and a bottom plate 90. Also mounted to the mounting frame 84 is a knife assembly 92. A set of blades 94 are mounted on the rotating member 82 and a set of knives 96 are mounted on the knife assembly 92. When assembled, the knives 96 pass through correspondingly shaped and sized apertures 98 in the bottom of plate 90 of the mounting frame 84, the rotating member 82 is mounted between the back end plate 86 and the front end plate 88, and the individual blades 94 are arranged to pass through gaps between the knives 96 during rotation of the rotating member 82. The rotating member 82 may be driven in a manner similar to that described for the first embodiment, as shown in FIG. 8. However, since the processor 10 discharges from the left hand side, no rotation conversion is required to drive the disintegrator 14 or feed cutter 81.

The rotary member 82 includes a shaft 98 that extends axially from the front and rear end of the rotating member 82. The shaft 98 is supported at each end by a set of bearings 100 mounted to the front and rear end plates 88, 86 respectively of the mounting frame 84. In the illustrated embodiment, the front bearings 100 are mounted through a mounting plate 101.

Figure 10:
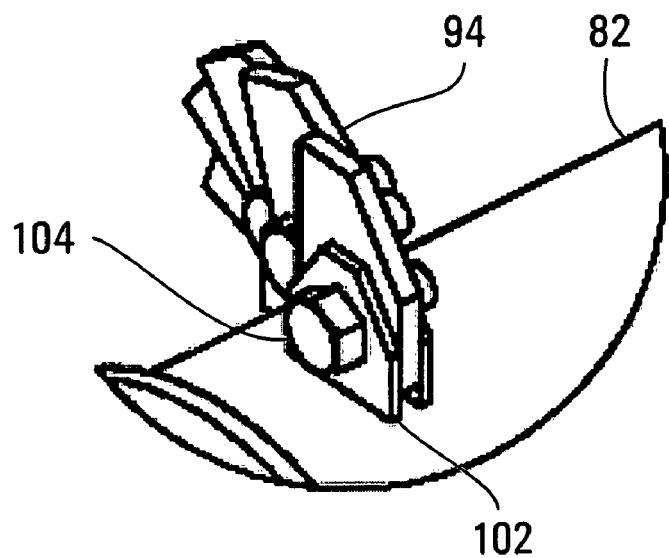
FIG. 10 is an enlarged view of blades on a rotating member of the feed cutter of FIG. 7.

As shown in FIG. 10, each blade 94 may be pivotally mounted to a bracket 102 extending radially from the rotating member 82 through the use of a bolt 104. As discussed, it will be appreciated by those skilled in the art that other ways, both fixed and pivoting, are available for mounting the blades 94. The blades 94 preferably will not be permanently affixed to the rotating member, so that they are replaceable. Although the blades 94 are illustrated arranged in a spiral pattern, other patterns of arrangement are clearly possible.

Figure 11:
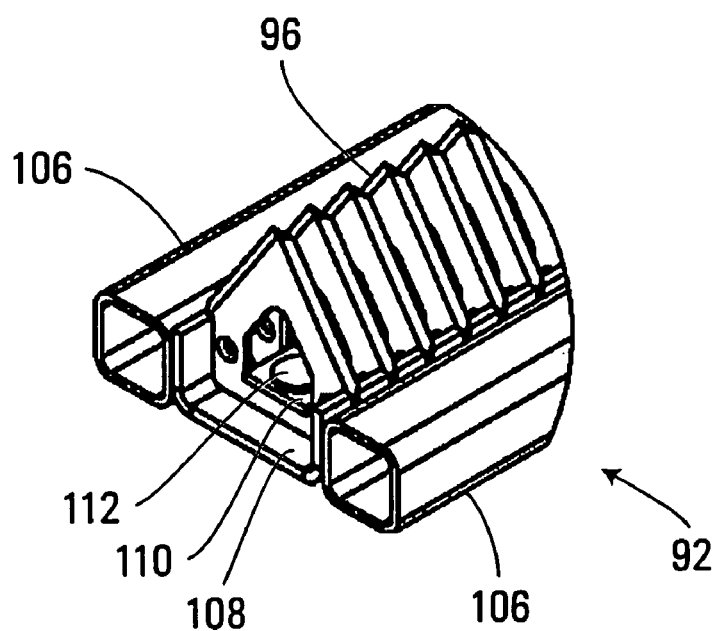
FIG. 11 is an enlarged view of fixed mounted knives of the feed cutter of FIG. 7.

As shown in FIG. 11, the illustrated knife assembly 92 includes a pair of support tubes 106 each fixed to a channel member 108. Each knife 96 may be received in a corresponding pair of slots in the channel member 108 provided for such purpose. As such, the knives 96 are replaceable. Each successive pair of knives 96 are attached to a knife attachment plate 110. The knife attachment plate 110 may be provided with an aperture to allow the through passage of a bolt 112. The bolt 112 may then be received in a corresponding aperture (not shown) in the channel member 108 so that pairs of knives 96 connected by respective knife attachment plates 110 may be detachably fixed to the knife assembly 92. As will be clear to a person of ordinary skill, many alternate arrangements for attaching the knives 96 to the feed cutter 81 are possible.

Although not shown, it is contemplated that the knife assembly 92 may be mounted to the mounting frame 84 by way of an adjustment mechanism that allows the extent to which the knives 92 extend through the apertures 98 to be adjusted. By adjusting this extent, the length of the material at the output of the feed cutter may be adjusted. If only minimal further processing is desired, the knives 92 may be lowered such that they do no extend above the plate 90.

As noted, it is advantageous to reduce the length of the baled crop material to increase the utilization of the shredded material as feed by the livestock. There may be times, however, when the reduction of the length of the baled crop material is not desired, say, when shredding straw for bedding. For such cases, alternative mounting arrangements for the feed cutter are presented herein that allows the rotating member 82 to be moved out of the discharge opening 32, that is, out of the path of material separated from a bale.

Figure 12:
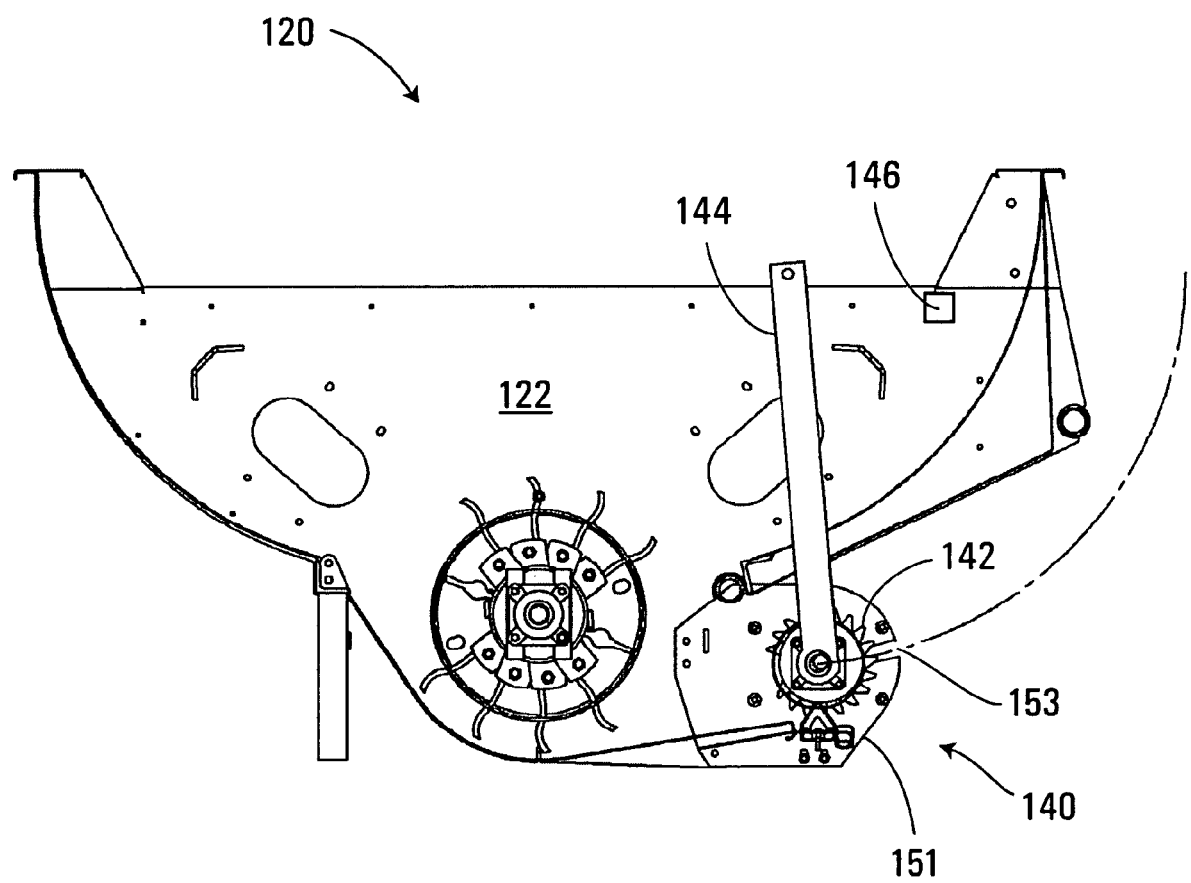
FIG. 12 is a front cross sectional view of a fourth embodiment of a bale processor including a feed cutter according to the invention, with the feed cutter in a working position.

As illustrated in FIG. 12, an alternative bale processor 120 has a processing chamber. A feed cutter 140, having the same elements as the feed cutter 81 of FIG. 7 (including a rotating member 142 and a front end plate 151 of a mounting frame) is mounted at the discharge opening of the alternative bale processor 120. A shaft connection extending from the front end of the rotating member 142 is supported in an aperture proximate a lower end of an upper pivot arm 144. The upper end of the upper pivot arm 144 is pivotally connected to the front end wall 122 of the processing chamber. A corresponding upper pivot arm supports a shaft connection at the back end of the rotating member 142.

Figure 9:
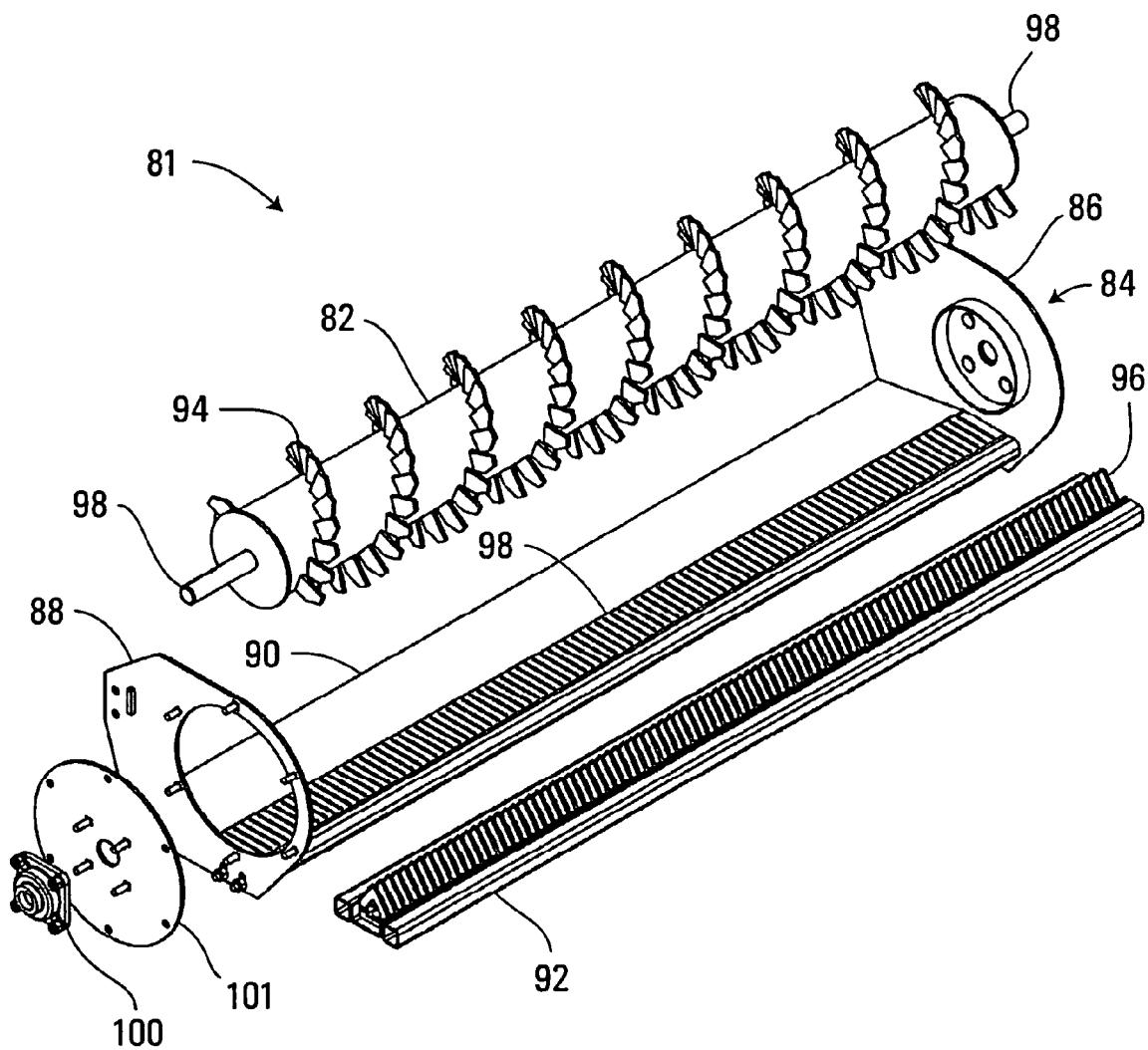
FIG. 9 is an exploded perspective view of the feed cutter of FIG. 7.

A slot 153 is provided in the front end plate 151 (and a corresponding slot is provided in the back end plate) to allow passage of the extension at the front end of the rotating member 142 when the upper pivot arm 144 is pivoted to move the rotating member 142 from a working position in the discharge opening upward, as illustrated in FIG. 9, to a non-working position wherein the rotating member 142 is removed from the discharge opening.

To maintain the upper pivot arm 144 in the non-working position, a locking mechanism is provided in the form of a retractable bar 146 extending, in a locking position, from the front end wall 122 of the processing chamber. To allow the upper pivot arm 144 to be pivoted into the non-working position, the retractable bar 146 is retracted into the processing chamber. Once the upper pivot arm 144 is in the non-working position, the retractable bar 146 is returned to the locking position wherein it extends from the front end wall 122 of the processing chamber and provides support to the upper pivot arm 144. Preferably, the locking mechanism also includes a corresponding retractable bar in the back end wall.

As will be apparent to a person of ordinary skill, unless the rotating member 142 is lifted at its center point or identical upward forces are applied to the upper pivot arm 144 at the front end and the corresponding upper pivot arm at the back end, one end of the rotating member 142 may have a tendency to rise higher than the other end. To reduce this tendency many approaches may be taken. In one approach, a relatively large bushing (not shown) is installed between each end of the rotating member 142 and the pivot arm to which each end attaches. In another approach, the upper pivot arms are connected by at least one cross brace (not shown).

Figure 14:
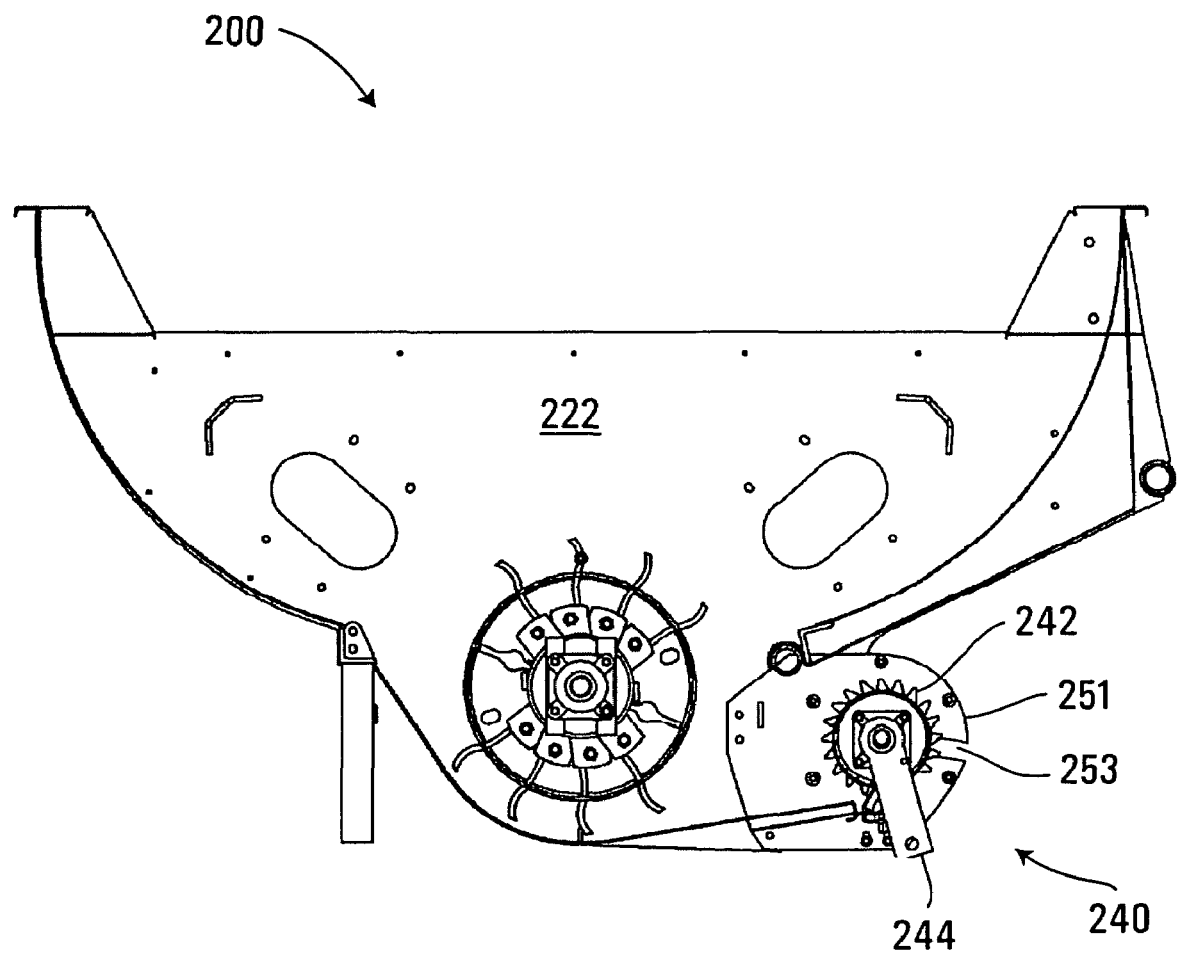
FIG. 14 is a front cross-sectional view of a fifth embodiment of a bale processor with a feed cutter according to the invention, with the feed cutter in a working position.

As illustrated in FIG. 14, a further alternative bale processor 200 has a processing chamber, of which a front end wall 222 is visible. A feed cutter 240 having the same elements as the feed cutter 140 (including a rotating member 242 and a front end plate 251 of a mounting frame), is mounted at the discharge opening of the further alternative bale processor 200. A shaft connection extending from the front end of the rotating member 242 is supported in an aperture proximate an upper end of a lower pivot arm 244. The lower end of the lower pivot arm 244 is pivotally connected to the front end plate 251 of the mounting frame 244. a corresponding lower pivot arm supports a shaft connection at the back end of the rotating member 242.

Figure 13:
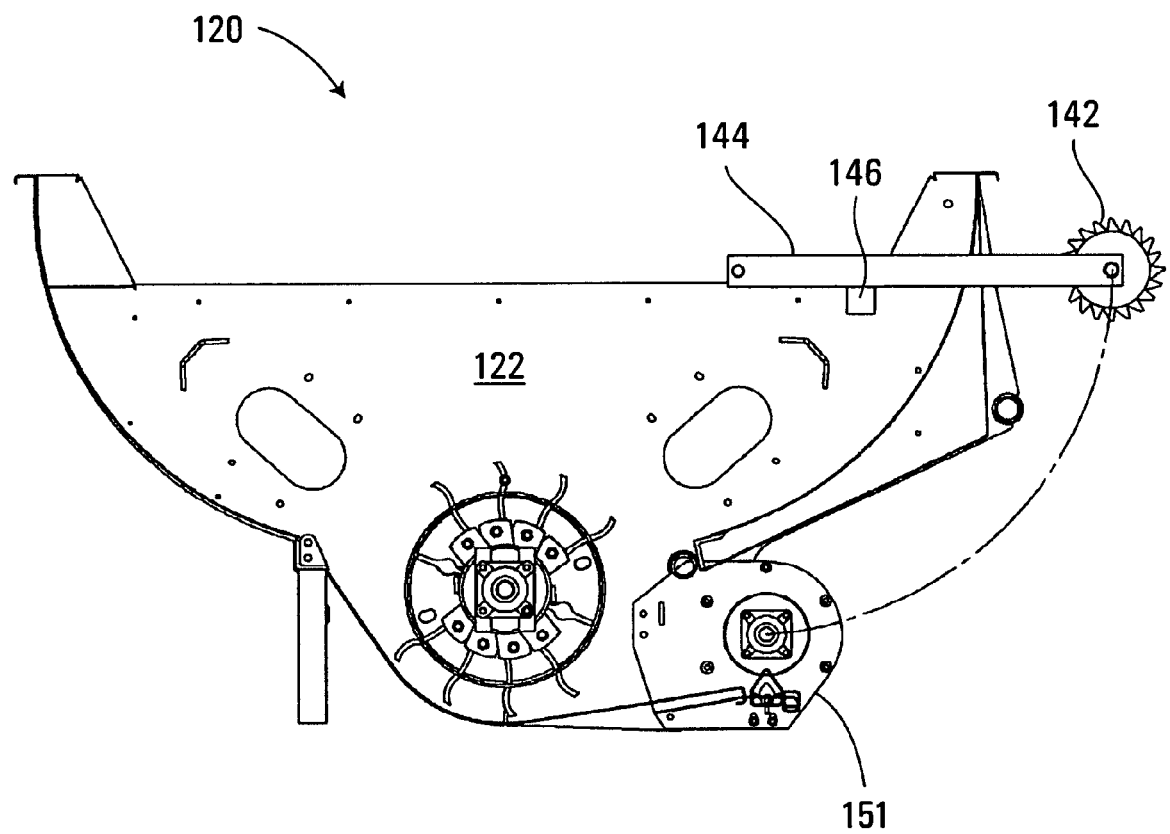
FIG. 13 is a front cross sectional view of the bale processor of FIG. 12, with the feed cutter in a non-working position.
Figure 15:
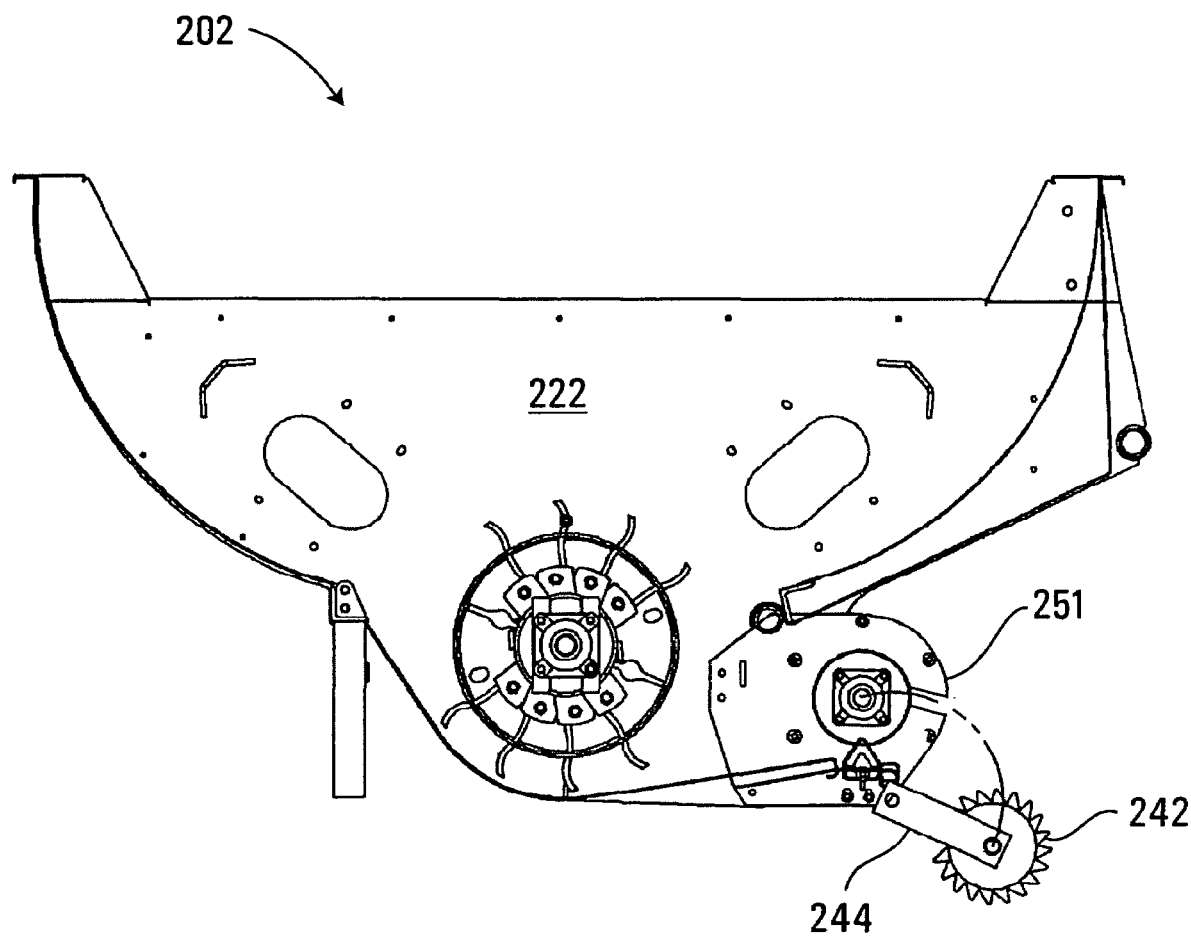
FIG. 15 is a front cross-sectional view of the bale processor of FIG. 14, with the feed cutter in a non-working position.

A slot 253 is provided in the front end plate 251 (and a corresponding slot is provided in the back end plate) to allow passage of the shaft connection at the front end of the rotating member 242 when the lower pivot arm 244 is pivoted downward, as illustrated in FIG. 15, to move the rotating member 242 out of the discharge opening.

Where the removal of the rotating member from the discharge opening is accomplished through pivoting upwardly, as illustrated in the embodiment of FIGS. 12 and 13, the first action required in preparing for such movement is disengagement of the transmission mechanism. Where the removal of the rotating member from the discharge opening is accomplished through pivoting downwardly, as illustrated in the embodiment of FIGS. 14 and 15, the disengagement of the transmission mechanism may not be necessary if there is enough slack in the element (e.g., belt, chain) used to transmit the rotation.

Optionally, in addition to moving the rotating member out of the discharge opening, the knife assembly or bottom pan may be disconnected and removed from the mounting frame so as to minimize impedance of the flow of shredded material leaving the bale processor. Alternatively, in the embodiment utilizing the knife assembly 92 and including the previously discussed adjustment mechanism, as discussed above, the extent to which the knives 96 extend through the apertures 98 may be minimized.

Although the power sources for movement of the rotating member out of the discharge opening have not been described, it will be appreciated that such power may be manual (and may use any number of forms of mechanical advantage) or may be powered (for instance, using a hydraulic cylinder driven off the hydraulic circuits if the tractor).

The feed cutter of the present invention may be sold as a kit separate from the bale processor to which it is attached. The mounting frame and feed cutter as described will generally be readily mounted on an existing bale processor.

Other modifications within the ambit of the following claims will be apparent to those skilled in the art.

We claim:

1. A bale processor comprising:
   a processing chamber with a discharge opening;
   a disintegrator mounted in said processing chamber adapted to separate baled crop material in said processing chamber and discharge it out of said processing chamber through said discharge opening; and
   a feed cutter comprising a rotating member with a plurality of blades mounted thereon;
   wherein said feed cutter can be configured in a working position outside the processing chamber in a path of separated crop material that has been discharged out of said processing chamber through said discharge opening, where said blades contact and further process separated crop material that has been discharged through said discharge opening;
   wherein said feed cutter can be configured in a non-working position where separated crop material that has been discharged through said discharge opening is not further processed; and
   wherein the feed cutter is outside the processing chamber when in the working position and when in the non-working position.

2. The bale processor of claim 1 wherein said feed cutter further includes deflectors mounted thereon which may be moved between a feed cutter working position wherein material being discharged through said discharge opening is directed toward said blades, and a non-working position wherein material being discharged through said discharge opening is deflected away from said blades.

3. The bale processor of claim 1 wherein said rotating member is maintained in said discharge opening and material being discharged through said discharge opening is engaged by said blades when the feed cutter is in the working position, and wherein said rotating member is removed from said discharge opening when the feed cutter is in the non-working position.

4. The bale processor of claim 1 wherein said blades are pivotally attached to said rotating member.

5. The bale processor of claim 1 wherein said blades are rigidly attached to said rotating member.

6. The bale processor of claim 1 wherein said blades are arranged in a spiral pattern around said rotating member.

7. The bale processor of claim 1 wherein pairs of blades are pivotally attached to projections on said rotating member, said projections being arranged in a spiral pattern on said rotating member.

8. The bale processor of claim 1 wherein said rotary member is mounted on a mounting frame attached to said bale processor and wherein said mounting frame includes a lower pan having projections arranged so as to assist cutting said material being discharged from said bale processor by said feed cutter.

9. The bale processor of claim 8 wherein said projections comprise ribs arranged on said pan generally parallel to the axis of rotation of said rotating member and wherein said rotating member and pan are mounted such that said blades rotate in close proximity to said ribs when said feed cutter is operated.

10. The bale processor of claim 8 wherein said pan includes a knife assembly with a plurality of knives attached thereto, said knives defining a plurality of gaps between said knives and wherein said knives are arranged such that, in operation, rotation of said rotating member causes said blades to pass through said gap between said knives.

11. The bale processor of claim 10 wherein said knife assembly is adapted to detachably receive said plurality of knives.

12. The bale processor of claim 10 wherein said knife assembly is detachably mounted on said mounting frame such that said plurality of knives extend through apertures in said pan and such that the extent to which said knives extend above said pan is adjustable.

13. The bale processor of claim 1 wherein said disintegrator is a flail roller that is rotated in operation such that flails extend to engage and separate the baled crop material, and wherein said rotary member of said feed cutter is connected through a transmission to said flail roller such that rotation of said flail roller also causes rotation of said rotating member.

* * * * *